United States Patent
Walling et al.

[11] Patent Number: 5,658,406
[45] Date of Patent: Aug. 19, 1997

[54] METHODS OF MAKING TELECOMMUNICATIONS CABLE

[75] Inventors: Jorg-Hein Walling, Beaconsfield; Gavriel L. Vexler, Westmount; Clement Gagnon, Pierrefonds; Benoit Arpin, Ste Julie, all of Canada

[73] Assignee: Nordx/CDT, Inc., St. Laurent, Canada

[21] Appl. No.: 343,855

[22] Filed: Nov. 17, 1994

[51] Int. Cl.$^6$ ............................ B29C 63/20; H01B 13/24
[52] U.S. Cl. ................. 156/51; 156/244.12; 156/244.21; 156/285
[58] Field of Search ..................... 156/47, 55, 56, 156/51, 285, 244.12, 244.21, 244.27; 427/117, 118, 295; 264/272.14, 272.11, DIG. 78, 176.1, 210.8

[56] References Cited

U.S. PATENT DOCUMENTS

| | | | |
|---|---|---|---|
| Re. 27,028 | 1/1971 | Ely, Jr. et al. | 428/35.1 |
| 1,419,090 | 6/1922 | Williams | 427/117 |
| 1,785,037 | 12/1930 | Martell et al. | 427/117 |
| 1,944,823 | 1/1934 | Lamont | 427/118 |
| 1,982,288 | 11/1934 | Evans | 156/50 |
| 2,173,565 | 9/1939 | Peterson | 174/117 R |
| 2,471,752 | 5/1949 | Ingmanson | 156/52 |
| 2,731,069 | 1/1956 | Horn | 425/112 |

*Primary Examiner*—Michael W. Ball
*Assistant Examiner*—Francis J. Lorin
*Attorney, Agent, or Firm*—Wolf, Greenfield & Sacks, P.C.

[57] ABSTRACT

Method of making a twisted conductor wire unit in which each wire of the pair is individually insulated. The twisted pair is provided with an outer extruded polymeric layer while a vacuum is applied to the pair at the extrusion position. The vacuum draws the polymeric layer down onto the pair and forces the insulated wires together along the length of the unit. The vacuum is insufficient to produce substantial longitudinal indentations in the polymer layer. This avoids spaces being provided between the insulated wires in the finished structure and provides a substantially constant distance between the wires to improve electrical and cross-talk characteristics.

9 Claims, 2 Drawing Sheets

5,658,406

METHODS OF MAKING TELECOMMUNICATIONS CABLE

BACKGROUND OF THE INVENTION

This invention relates to methods of making telecommunications cable.

In telecommunications cable designs having twisted pairs of conductors in their cores, it is a design ideal to provide inductive and capacitive balance between the conductors of each pair. Such balance depends upon maintaining the conductors a specific distance apart along their twisted lengths, but unfortunately in practice, specific distance maintenance is impossible to achieve. While insulation thickness on a conductor is controllable within extremely narrow limits, absolute control upon the twisting operation so as to achieve a constant distance between the conductors is impossible as pressure between the surfaces of the conductor insulation is known to vary and localized gaps may even be present between these surfaces along the twisted pair lengths. This manufacturing problem provides the main reason for capacitive and inductive imbalances along the cable and, in this respect, tends to increase cross-talk between conductor pairs in cable. Cross-talk becomes a more exaggerated and serious problem for cables when transmitting high frequency signals. Solutions to the above problem have long been desirable but without positive results.

In addition, there may be tightening or loosening of the twist between conductors of a pair when the pair is being formed, together with other pairs, into a cable core. This tightening or loosening effect only serves to exacerbate the capacitance and inductance problems.

Suggestions have been made, for instance, as in U.S. Pat. No. 3,102,160, for insulating both conductors of a pair simultaneously with a single insulation which extends between and encompasses both conductors. However, while such a common insulation is extruded onto the conductors to maintain the distance apart of the conductors at any position along their lengths, it does not solve the capacitance or inductance problems. This is because the distance apart of the conductors is not controllable as they are fed through the extrusion orifice while being coated with the insulating material. Perhaps one of the reasons for this is that because of the shape of the extrusion orifice, the extrusion forces are not balanced and there is a lateral pull upon the conductors which needs to be corrected.

A further problem which applies to twisted conductors having their own individual insulation, is that while efforts have been made as mentioned above to maintain the distances between the conductors constant along their lengths, it has been found that upon incorporation into cable cores and also during bending of cable in use, that at certain positions conductors of certain pairs are likely to move apart under the different tensions and bend radii which are applied and thus the capacitance and inductance imbalance then becomes more exaggerated.

SUMMARY OF THE INVENTION

The present invention provides a method of making an insulated twisted conductor wire unit in which the above problems are minimized.

Accordingly, the present invention provides a method of making an insulated twisted conductor unit comprising: providing a twisted pair of conductors each having an individual covering insulation layer of constant thickness along the conductor length; passing the twisted pair along a passline through an extruder head and into an extrudable polymeric material while applying vacuum to the pair from an upstream position of the passline; and extruding the polymeric material around the twisted pair with the vacuum acting upon the polymeric material to urge it against the insulation layers to force the insulation layers into contact continuously along the twisted pair, the polymeric material then forming a gripping layer to hold the insulation layers in said continuous contact.

With the above method according to the invention, as the insulation is of constant thickness and the insulation layers are in contact continuously along their lengths, there is at most an insignificant change in the spacing apart of the two conductors. Hence, inductive and capacitive imbalance is reduced to a minimum.

Further, the gripping layer will assist in reduction of cross-talk between Pairs as the outside diameter of the gripping layer is larger than is normally the case for individual conductors of a twisted pair and this acts against lodging of any part of one twisted pair between the conductors of any other pair. In fact, in a preferred method the gripping layer is formed devoid of grooving longitudinally of the unit which renders it impossible for one twisted unit to nest within another.

It is preferable to provide the gripping material from fluorinated ethylene propylene material. This material is well known for its flame retardant properties for inside cable usage, but normally has a distinct disadvantage in that it may only be extruded onto a conductor as an insulation layer at relatively slow speeds compared to other materials. This of course has the result in slowing down production of twisted pairs. In this particular invention however where it is used to encompass a complete twisted pair, while it may only be extruded at the slow rate as referred to above, nevertheless being applied to two conductor wires simultaneously in the production of the unit, it enables an insulated twisted pair to be produced at a more acceptable speed than has been possible previously while using this particular insulating material.

Under extrusion conditions for the gripping layer, it is easy to provide substantially the same gripping loads to the twisted pair along the total length of the unit so that insignificant variations in pressure between the insulation layers and insignificant changes in distance between the conductors results. It follows therefore that capacitance and inductance imbalance is insignificant along the length of the unit.

In addition, the invention provides a method of making a telecommunications cable having a core comprising a plurality of insulated twisted conductor units comprising making each unit by: providing a twisted pair of conductors each having an individual covering insulation layer of constant thickness along the conductor length; passing the twisted pair along a passline through an extruder head and into an extrudable polymeric material while applying a vacuum to the pair from an upstream position along the passline; and extruding the polymeric material around the twisted pair with the vacuum acting upon the polymeric material to urge it inwardly against the insulation layers to force the insulation layers into contact continuously along the twisted pairs, the polymeric material then forming a gripping layer to hold the layers in said continuous contact.

The invention further provides an insulated twisted conductor unit comprising a twisted pair of conductors each insulated with an individual covering insulation layer of constant thickness along the conductor length, the insulation layers contacting each other continuously along the pair, and a gripping layer of polymeric material surrounding the insulated twisted pairs, the gripping layer serving to hold the insulation layers in mutual contact continuously along the length of the unit.

The present invention also provides a telecommunications cable having a core comprising a plurality of insulated twisted conductor units, each unit comprising a twisted pair of conductors each insulated with an individual covering insulation layer of constant thickness along the conductor length, the insulation layers contacting each other continuously along the pair, and a gripping layer of polymeric material surrounding the insulated twisted pairs, the gripping layer serving to hold the insulation layers in mutual contact along the whole length of the wire unit.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
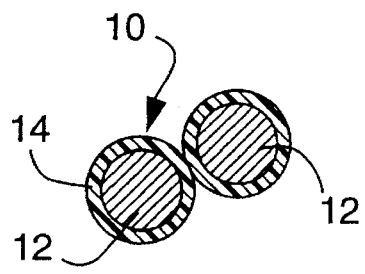
FIG. 1 is a cross-sectional view through an insulated twisted conductor pair at one longitudinal position, the pair provided for making a conductor unit of a first embodiment.
Figure 2:
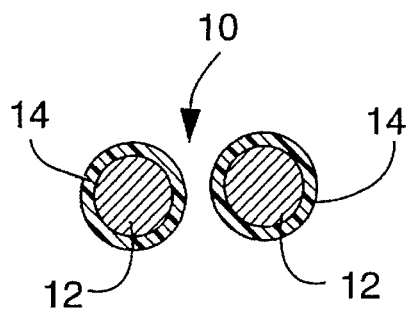
FIG. 2 is a view of the pair similar to FIG. 1 and at a different longitudinal position.

An insulated twisted conductor unit according to a first embodiment and as will be described comprises a twisted pair 10 of individually insulated conductors 12, the insulation being provided by an individual layer of insulating material 14. As shown in FIG. 1, the twisted conductor pair, which is formed in a conventional manner for twisting pairs of conductors, is ideally formed with the surfaces of the insulating layers 14 contacting completely along the length of the twisted pair. However, because of inadequacies in the twisting operation and other possible uncontrollable parameters it is sometimes found that the conductors are not spaced the same distance apart for the whole length of the twisted pair due to differences in pressure between the contacting surfaces of the insulation layers 14 and, indeed at various positions the insulation layers 14, may be even spaced apart as shown in FIG. 2. If such a twisted conductor pair were to be used in this state in the manufacture of a cable core, then it would lead to inductive and capacitance unbalance which would produce cross-talk problems in the finished cable, particularly if the cable were to be used for high frequency signal transmission such as for data use. This embodiment provides a method, as will now be described, for the continuous contact of the outer surfaces of the insulation layers 14 right along the complete length of the twisted pair to ensure that the inductive and capacitance unbalance is insignificant and the pair may therefore be used for high frequency use. For this purpose the twisted conductor wire unit includes a gripping outer layer 16 such as is shown by FIG. 4 this layer 16 being also of polymeric material which has an insulating function and holds the surfaces of the layers 14 in contact for the full length of the twisted pair.

Figure 3:
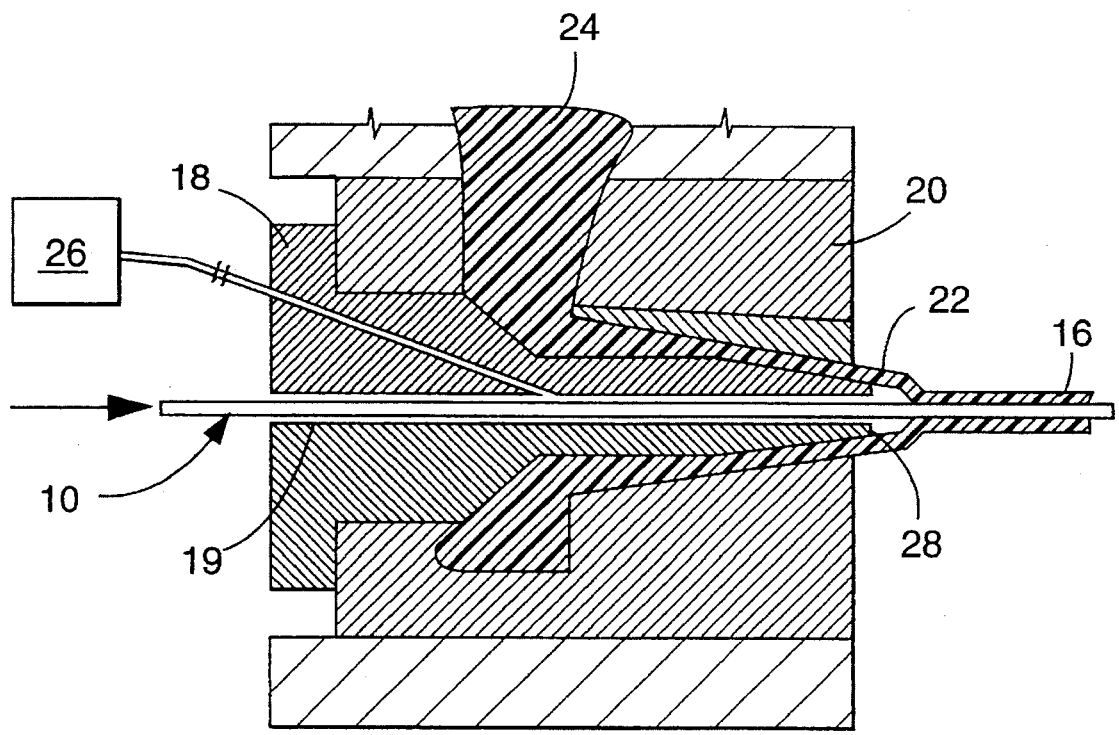
FIG. 3 is a cross-sectional view through an extruder head showing the process of making a twisted conductor unit according to the first embodiment.

To achieve such a unit in this desired condition, the twisted pair, which may have spacings between the insulations 14 as shown in FIG. 2, is passed along a passline through a core tube 18 within an extruder head 20 to be passed through the extruder orifice 22 together with extrudate 24 which upon extrusion provides the layer 16. The pressure of extrusion alone cannot be relied upon to force the insulated conductors towards each other from locations where they are spaced apart. The extrudate is fed around the downstream end 28 of the core tube which projects slightly from the extruder orifice as is applied by what is commonly referred to as a "tubing" operation. In the tubing operation the extrudate is pulled down onto the conductor pair by constant tension applied by the drawing-off operation and this is insufficient force to urge the insulated conductor wires together. However, a vacuum is applied along the length of the passage 19 of the core tube 18 from an upstream source 26 shown diagrammatically in FIG. 3. This vacuum reduces the air pressure within the core tube at a location where the extrudate 24 actually moves into contact with the insulation layers 14 and draws the layer 16 inwardly as it leaves the downstream end of the core tube to urge it against the insulated conductor wires. This inward drawing force is sufficiently great to force the insulated conductor wires together at positions where they are initially spaced apart. Hence a contact between the insulation layers 14 is achieved continuously along the length of the twisted pair. The layer 16 is extruded under controlled conditions whereby the insulation layers 14 are held together by a constant pressure from end-to-end of the twisted pair thereby ensuring that the conductors 12 are maintained a distance apart which changes insignificantly along the whole length of the pair. As the distances apart of the conductors 12 is maintained, then inductive and capacitive balance is achieved.

Figure 4:
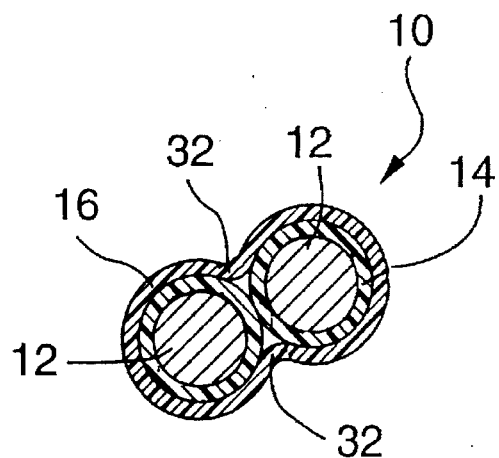
FIG. 4 is a cross-sectional view through the conductor unit of the first embodiment.

The application of the vacuum is thus effective at the position at which the layer 16 is being pulled down and draws the layer 16 inwards between the conductors of the pair to provide two longitudinal indentations 32 between the conductors (FIG. 4). The degree to which the layer 16 is drawn inwards depends upon the effectiveness of the vacuum. The layer 16 is effective only in drawing the insulated conductors together under vacuum conditions but also in the finished state of the unit grips the pair to hold the insulated conductors in contact.

Figure 5:
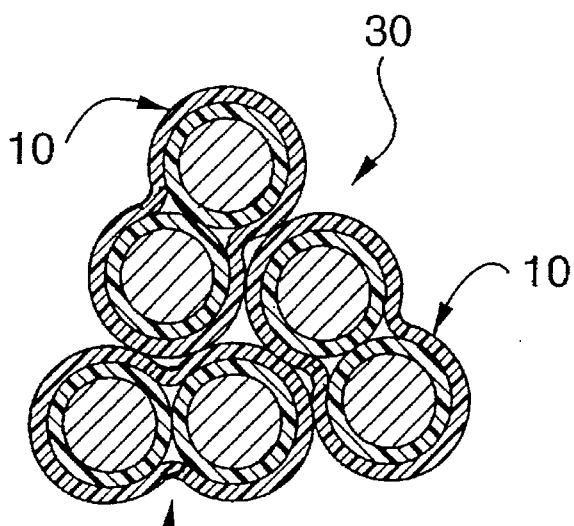
FIG. 5 is a cross-sectional view through part of a cable core including a plurality of conductor units of the first embodiment.

When incorporated into a cable, as shown in FIG. 5, a core 30 of the cable (part of the core being shown) comprises a plurality of units 10 which are disposed side-by-side along the cable length. Although the thickness of the layer 16 is substantially constant around the two insulated conductors of each unit, longitudinal indentations 32 on each side of the layer 16 (FIG. 4) are less pronounced than would be the case for a normal twisted pair in which each conductor has the whole of the insulation formed individually upon itself. As a result of this, there is less nesting effect between the units in the core 30 than would be the case for normal twisted pairs and this has the effect of improving the electrical and cross-talk characteristics between the conductors in the pairs of adjacent units.

While the insulation layers 14 and the gripping layer 16 may be provided by any suitable insulating materials, it is a particular advantage in this embodiment and according to the invention that the gripping layer 16 should be formed from fluorinated ethylene propylene (e.g. Teflon). This particular material when applied to conventional conductors has such a slow extrusion rate for a correct application, e.g. around 300 meters/min. as compared to 1100 meters/min.

for other insulation materials, that it seriously increases the time required for production of insulated conductors. However, in this embodiment and within the scope of the invention, where the formation of the unit 10 includes two insulated conductors, then the slow extrusion speed for the fluorinated ethylene propylene is of less consideration. This is because the fluorinated ethylene propylene provides an insulating layer on two conductors simultaneously so that the fluorinated ethylene propylene is effectively formed at twice the normal speed upon two conductors. This of course results in greater increase in speed for the production of the whole unit 10 as compared to a production of a normal twisted pair using fluorinated ethylene propylene for at least part of the insulation on each individual conductor.

Another distinct advantage with the unit shown in FIG. 4 is that when incorporated with other units as shown by FIG. 5 into a cable core 30, there is no possibility of the conductors of any pair from moving further apart during the cabling operation (such as may occur with conventional pairs) because of the restrictive action of the gripping layer 16. This advantage also applies where a cable is installed and is bent to follow a certain path in that the longitudinal forces applied to its conductor pair cannot result in further separation of its conductors.

In the first embodiment, with the fluorinated ethylene propylene being transparent in each unit 10, a color coding identification, visible through the gripping layer 16, is advantageous for the unit. In this embodiment, the identification may be by providing one or both of the layers 14 with its own color code. Alternatively (not shown) a color coded filament is visible through the gripping layer 16.

Figure 6:
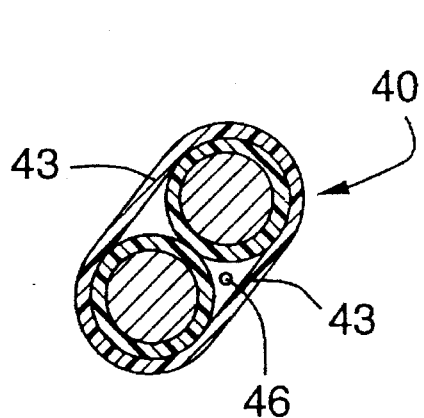
FIG. 6 is a view similar to FIG. 4 of a conductor unit according to a second embodiment.
Figure 7:
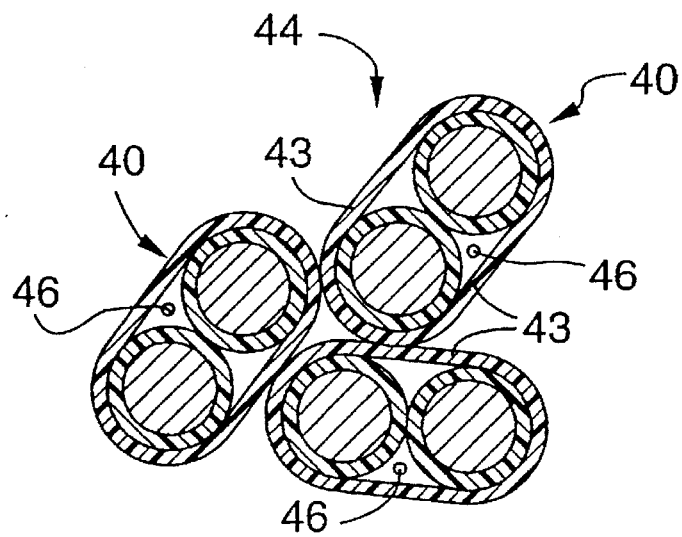
FIG. 7 is a cross-sectional view through part of a cable core including a plurality of conductor units of the second embodiment.

As has been noted in the first embodiment, the unit of that embodiment will nest with other units in the formation of a cable core to a lesser degree than is the case for a conventional conductor pair. However, in a second embodiment as shown by FIGS. 6 and 7, a conductor unit 40 which is constructed otherwise similarly to the unit in FIG. 5 has a gripping layer 42 which is formed with flat sides 43 so that no longitudinal external indentations exist. As a result of this, the gripping layer 42 has a continuous outer surface which is devoid of longitudinal indentations in its outer periphery and as shown in FIG. 7 this results in complete lack of nesting of the units 40 within the cable core 44. This may require greater volumetric space for the total core, but at least it does provide for improved electrical and cross-talk characteristics within the cable.

In the second embodiment with the gripping layer 42 of each unit being transparent, a color coded filament 46 is conveniently trapped by the layer to differentiate or help differentiate the unit from others in the core.

The size of the completed unit in either embodiment is not significantly greater than that of a normal twisted pair. For instance each layer 14 upon its conductor 12 may have a thickness of about 6.5 mil while it has been found that the gripping layers 16 or 42 need only have a thickness of approximately 3 mil to perform their gripping characteristics and hold the insulating layers 14 in constant contact. A layer of only 2 mil in thickness for the gripping layer has been found satisfactory. As indicated above, both the layers 14 and 16 or 14 and 42 may be formed of any suitable material for their required purpose and preferably the outer gripping layer is formed most readily by the method of the invention from the significantly advantageous material, fluorinated ethylene propylene. Of course other materials may also be found to be satisfactory such as polyvinylchloride compositions or EPTFE compositions.

What is claimed is:

1. A method of making an insulated twisted conductor wire unit comprising:

providing a twisted pair of conductors each having an individual covering insulation layer of constant thickness along the conductor length;

passing the twisted pair along a passline through an extruder head and into an extrudable polymeric material;

applying a vacuum to the pair from an upstream position of the passline while the pair is passed along the passline;

extruding the polymeric material around the twisted pair; and drawing together the insulated conductor of the twisted pair by the vacuum acting upon the extruded polymeric material with sufficient force to urge it against the insulation layers and with sufficient force to draw the insulation layers into contact continuously along the twisted pair and with the vacuum acting upon the extruded polymeric material with insufficient force to produce substantial longitudinal indentations, the polymeric material then forming a gripping layer to hold the insulation layers in said continuous contact.

2. A method according to claim 1 comprising forming the gripping layer from fluorinated ethylene propylene.

3. A method according to claim 1 comprising forming the gripping layer devoid of longitudinal indentations.

4. A method according to claim 1 comprising forming the gripping layer from a transparent material to provide transparency to the gripping layer and providing a color coding identification visible inside the gripping layer.

5. A method according to claim 4 comprising providing the twisted pair with at least one of the insulation layers having its individual color coding identification which is visible through the gripping layer.

6. A method according to claim 4 comprising providing a color coded filament within the gripping layer and which is visible through the gripping layer.

7. A method of making a telecommunications cable having a core comprising a plurality of insulated twisted conductor units comprising making each unit by:

providing a twisted pair of conductors each having an individual covering insulation layer of constant thickness along the wire length;

passing the twisted pair along a passline through an extruder head and into an extrudable polymeric material;

applying a vacuum to the pair from an upstream position along the passline while the pair is passed along the passline;

extruding the polymeric material around the twisted pair; and drawing together the insulated conductor of the twisted pair by the vacuum acting upon the extruded polymeric materials with sufficient force to urge it inwardly against the insulation layers and with sufficient force to draw the insulation layers into contact continuously along the twisted pair and with the vacuum acting upon the extruded polymeric material with insufficient force to produce substantial longitudinal indentations, the polymeric material then forming a gripping layer to hold the insulation layers in said continuous contact.

8. A method according to claim 7 wherein in each wire unit the gripping layer is formed from fluorinated ethylene propylene.

9. A method according to claim 7 wherein in each unit the gripping layer is formed with a continuously convex shape around its periphery.

* * * * *